(12) United States Patent
Kang et al.

(10) Patent No.: US 11,178,391 B2
(45) Date of Patent: Nov. 16, 2021

(54) COLOR CALIBRATION

(71) Applicant: Hewlett-Packard Development Company, L.P., Houston, TX (US)

(72) Inventors: Jinman Kang, San Diego, CA (US); Santiago Garcia-Reyero Vinas, San Diego, CA (US); Robert L Mueller, San Diego, CA (US); Ben Wynne, San Diego, CA (US); Amit A Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 637 days.

(21) Appl. No.: 15/509,797

(22) PCT Filed: Sep. 9, 2014

(86) PCT No.: PCT/US2014/054649
§ 371 (c)(1),
(2) Date: Mar. 8, 2017

(87) PCT Pub. No.: WO2016/039726
PCT Pub. Date: Mar. 17, 2016

(65) Prior Publication Data
US 2017/0302915 A1  Oct. 19, 2017

(51) Int. Cl.
*H04N 9/31* (2006.01)
*H04N 9/73* (2006.01)
(Continued)

(52) U.S. Cl.
CPC ......... *H04N 17/002* (2013.01); *H04N 5/2256* (2013.01); *H04N 5/2353* (2013.01);
(Continued)

(58) Field of Classification Search
CPC .. H04N 17/002; H04N 5/2256; H04N 5/2353; H04N 9/3182; H04N 9/735; H04N 17/02
(Continued)

(56) References Cited

U.S. PATENT DOCUMENTS 3,668,311 A * 6/1972 Bigliano ................. G06G 7/75
358/534
7,599,561 B2  10/2009 Wilson et al.
(Continued)

FOREIGN PATENT DOCUMENTS

| CN | 1517780 | 8/2004 |
| CN | 102365581 | 2/2012 |

(Continued)

OTHER PUBLICATIONS

Ilie, "Ensuring Color Consistency Across Multiple Cameras," Dept of Computer Science, Univ of North Carolina Chapel Hill, Apr. 2004, pp. 1-9.
(Continued)

*Primary Examiner* — Brian P Yenke
*Assistant Examiner* — Omer Khalid
(74) *Attorney, Agent, or Firm* — Lakshmi Kumaran & Sridharan

(57) ABSTRACT

The present subject matter relates to examples of color calibration of image handling units. In an example, color settings of a flash light unit of a projector unit of a computing system may be calibrated with reference to a target calibration point. The flash light unit may function as an illumination source for an image capturing unit of the computing system. Further, based on the target calibration point and an image captured by the image capturing unit under illumination provided by the flash light unit, the color settings of the image capturing unit may be calibrated to synchronize
(Continued)

the color settings of the image capturing unit to the color settings of the flash light unit.

20 Claims, 6 Drawing Sheets

(51) Int. Cl.
    *H04N 17/00*         (2006.01)
    *H04N 5/225*         (2006.01)
    *H04N 5/235*         (2006.01)
    *H04N 17/02*         (2006.01)

(52) U.S. Cl.
    CPC ........... *H04N 9/3182* (2013.01); *H04N 9/735* (2013.01); *H04N 17/02* (2013.01)

(58) Field of Classification Search
    USPC .................. 348/744, 187, 188, 189; 345/589
    See application file for complete search history.

(56) References Cited

U.S. PATENT DOCUMENTS

| | | | |
|---|---|---|---|
| 7,639,260 B2 | 12/2009 | Bala et al. | |
| 7,710,391 B2 | 5/2010 | Bell et al. | |
| 7,929,751 B2* | 4/2011 | Zhang | G06T 7/521 356/511 |
| 7,936,374 B2 | 5/2011 | Cutler | |
| 8,121,640 B2 | 2/2012 | Russ et al. | |
| 8,199,117 B2 | 6/2012 | Izadi et al. | |
| 8,606,004 B2 | 12/2013 | Jaynes et al. | |
| 8,736,583 B2 | 5/2014 | Anderson et al. | |
| 8,777,418 B2 | 7/2014 | Wright et al. | |
| 8,836,796 B2* | 9/2014 | Dickins | G09G 3/006 348/189 |
| 2004/0140981 A1* | 7/2004 | Clark | H04N 9/3182 345/600 |
| 2005/0078092 A1 | 4/2005 | Clapper | |
| 2007/0195209 A1 | 8/2007 | Cheng | |
| 2008/0018591 A1 | 1/2008 | Pittel et al. | |
| 2008/0252749 A1* | 10/2008 | Fujiwara | H04N 5/23219 348/224.1 |
| 2009/0086081 A1* | 4/2009 | Tan | G01B 11/2509 348/333.1 |
| 2010/0277492 A1 | 11/2010 | Frederick et al. | |
| 2011/0050859 A1* | 3/2011 | Kimmel | G01B 11/2509 348/50 |
| 2011/0058098 A1* | 3/2011 | Ivashin | H04N 5/23222 348/362 |
| 2011/0090345 A1* | 4/2011 | Ishii | G06T 7/246 348/169 |
| 2011/0242054 A1 | 10/2011 | Tsu | |
| 2012/0038892 A1 | 2/2012 | Kurtz et al. | |
| 2012/0127324 A1 | 5/2012 | Dickins et al. | |
| 2012/0320042 A1 | 12/2012 | Green et al. | |
| 2013/0027418 A1 | 1/2013 | Tryndin et al. | |
| 2013/0076789 A1* | 3/2013 | Majumder | H04N 9/3147 345/633 |
| 2013/0077236 A1 | 3/2013 | Becze et al. | |
| 2014/0184765 A1 | 7/2014 | King | |
| 2015/0222842 A1* | 8/2015 | Kwong | H04N 9/3182 348/745 |

FOREIGN PATENT DOCUMENTS

| | | |
|---|---|---|
| CN | 102769760 | 11/2012 |
| CN | 103198778 | 7/2013 |
| CN | 203519988 | 4/2014 |
| EP | 1443775 | 8/2004 |
| TW | 200939185 | 9/2009 |
| WO | WO-2014/042100 A1 | 3/2014 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

Benzeroual, Karim : "Acquisition d'images stereoscopiques of calibration de cameras par algorithmes genetiques : application dans le domaine biomedical," Jul. 1, 2010, XP055139419, retrieved from the Internet: URL: http://www. applis.univ-tours.fr/theses/2010/karim.benzeroual_3432. pdf (retrieved on Sep. 10, 2014) (p. 108: figures IV-18, IV-19) (215 pages).

Benzeroual, Karim: "Acquisition d'images stereoscopiques et calibration de cameras par algorithmes genetiques : application dans le domaine biomedical," Jul. 1, 2010, XP055139419, retrieved from the Internet: URL: http://www. applis.univ-tours.fr/theses/2010/karim.benzeroual_3432. pdf (retrieved on Sep. 10, 2014) (p. 108: figures IV-18, IV-19) (215 pages).

European Patent Office, Extended European Search Report for Appl. No. 14901714.7 dated Mar. 22, 2018 (12 pages).

* cited by examiner

COLOR CALIBRATION

BACKGROUND

Generally, an image handling unit, such as an image capturing unit or an image display unit, may have corresponding target color settings. Target color settings may be considered to be settings used for capturing or displaying images by the image handling unit. Generally, image handling units are color calibrated, based on target color settings, for display or capture of an image of an object or scene so that the image closely resembles the actual object or scene. Further, different image handling units may have different target color settings and may be calibrated accordingly.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
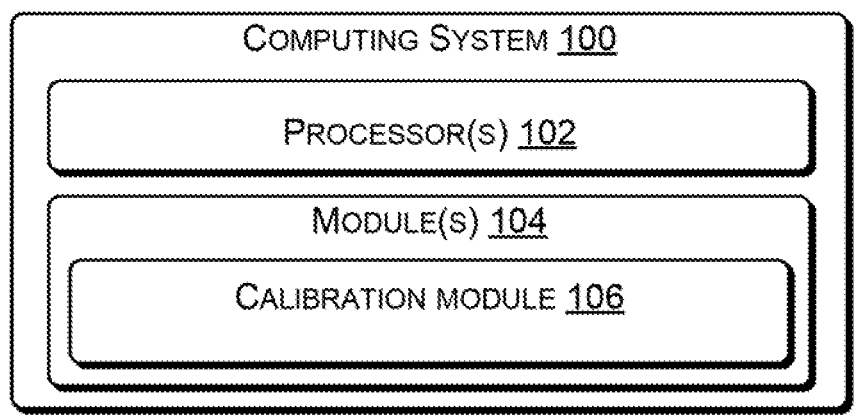
FIG. 1 illustrates an example computing system, in accordance with an example of the present subject matter.

Generally, image handling units, such as image display units and image capturing units, may be calibrated with respect to their corresponding target color settings. The image handling units may be calibrated by the manufacturer using the target color settings to correct color calibration defects, such as defects in brightness, hue, and saturation, of images that are captured or displayed. Various calibration techniques may be used to calibrate the image handling units. Further, a calibration technique used for one image handling unit may vary from that used for another. Additionally, the target color settings for different image handling units may also be different. For instance, a camera may have different target color settings and may be calibrated using a different calibration technique as compared to a monitor. Furthermore, the calibrations for different image handling units may be performed in different lighting conditions, which may further add to variations in the target color settings and in turn the display of the image.

For example, an image captured by a camera associated with a computing system may be displayed differently on a monitor of the same computing system due to variations in calibration settings of the camera and the monitor. Further, inconsistency in color calibrations may affect an image quality of a captured or displayed image. Additionally, more the number of image handling units associated with a computing system, greater the range of the color variations that may be seen between the image handling units owing to the variations in the calibration settings.

Aspects of the present subject matter relate to color calibration of multiple image handling units associated with a computing system. The present subject matter provides for uniform calibration of the image handling units of the computing system. An image handling unit may be understood as a unit, which assists in capturing an image or displaying the captured image. Accordingly, the image handling units may include image capturing units, such as a video camera and a still camera, and image display units, such as a monitor, a display screen, and a projector unit.

In an example, the computing system includes a plurality of image handling units, such as display unit(s), an image capturing unit, and a projector unit. Each of the image handling units may have been calibrated with respect to corresponding target color settings, hereinafter referred to as color settings. Further, as the various image handling units may be provided by various manufacturers, the color settings of the image handling units may vary. In an example, to synchronize the color settings of the image handling units of the computing system, the image handling units may be calibrated with respect to a target calibration point. The target calibration point may be understood as a reference point in a color space with respect to which the color settings of each of the image handling units may be calibrated to have uniformity in the image displayed and captured by the image handling units. The target calibration point, in an example, may be a white point, such as D65, defining white color in color space.

The color setting of an image handling unit may be expressed in various terms, such as pulse width modulation (PWM) values, red green blue (RGB) color space values, a white balance estimation, exposure estimation, or a combination of these. Based on the target calibration point the color settings of a projector unit may be calibrated. For instance, PWM values of the projector unit may be calibrated with respect to the target calibration point.

In an example, a flash light unit of the projector unit may be calibrated, with reference to the target calibration point, so as to project images onto a display unit of the computing system. The flash light unit may also provide ambient light for the image capturing unit, thereby functioning as an illumination source. Further, a display module of the projector unit may also be calibrated based on the target calibration point. The display module may provide for display of images on the display unit of the computing system. Since, the display module and the flash light unit may be calibrated with respect to same target calibration point, it ensures that variations between projection of the image and the flash light are minimized and the color settings are consistent with a common calibration point.

In an example, based on images captured using the calibrated flash light unit as the illumination source, the color settings of the image capturing unit may be calibrated. This ensures that the image captured by the image capturing unit has substantially the same color representation across the different image display units irrespective of external light conditions.

Further, in an example, in addition to calibrating the image capturing unit, a display unit, from among multiple display units, of the computing system may also be calibrated based on the target calibration point. This ensures that various image handling units coupled to the computing system have similar color representation, thereby minimizing the chances of variations in an image captured by an image handling unit but displayed on another image handling unit. As the image handling units are calibrated with respect to a common target calibration point, the color settings of an image capturing unit may not have to be individually adjusted for each unit, thereby making color calibration of a computing system involving multiple image handling units simple and efficient.

The above aspects of the present subject matter and other aspects are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

Examples of how systems and methods for color calibration may be implemented are explained in detail with respect to the figures. While aspects of described devices and methods for color calibration can be implemented in any number of different devices, environments, and/or implementations, the examples and implementations are described in the context of the following figure(s).

FIG. 1 illustrates a computing system 100, according to an example of the present, subject matter. The computing system 100 may be implemented as any of a variety of computing devices, such as servers, storage devices, workstations, personal computers, laptops, and other computing devices.

As illustrated, the computing system 100 may include, among other things, a processor 102 and module(s) 104 coupled to the processor 102. The processor 102 may include Microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The modules 104, amongst other things, include routines, programs, objects, components, and data structures, which perform particular tasks or implement particular abstract data types. The modules 104 may also be implemented as, signal processor(s), state machine(s), logic circuitries, and/or any other device or component that manipulate signals based on operational instructions. Further, the modules 104 can be implemented by hardware, by computer-readable instructions executed by a processing unit, or by a combination thereof.

The modules 104 may include a calibration module 106 to uniformly calibrate color settings of a plurality of image handling units, such as a projector unit (shown in FIG. 2) and an image capturing unit (shown in FIG. 2), of the computing system 100. The calibration module 106 may calibrate color settings of each of a display module and a flash light unit of a projector unit with reference to a target calibration point. The calibration module 106 may also calibrate the color settings of the image capturing unit, based on an image that is captured using the flash light unit, to synchronize the color settings of the image capturing unit to the color settings of the projector unit. The color calibration performed by the computing system 100 is explained in detail with reference to description of FIG. 2.

Figure 2:
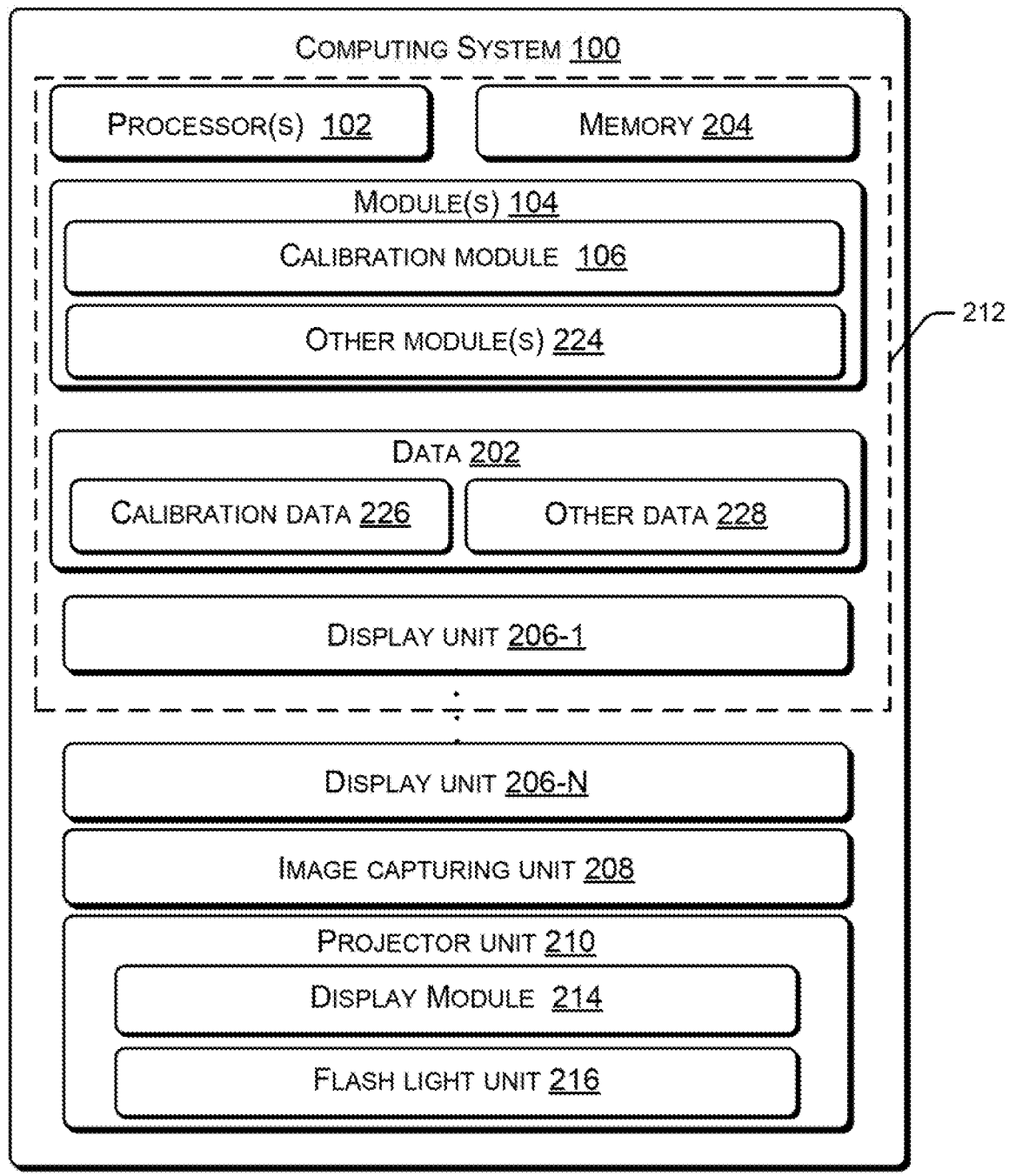
FIG. 2 illustrates various components of an example computing system, in accordance with an example of the present subject matter.

FIG. 2 illustrates various components of the computing system 100, according to an example of the present subject matter. The computing system 100 includes, for instance, the processor(s) 102, the modules 104, data 202, memory 204, and a plurality of image handling units, such as display unit(s) 206-1, . . . , 206-N, an image capturing unit 208, and a projector unit 210. The display units 206-1 . . . , 206-N may be individually referred to as display unit 206 and may be collectively referred to as display units 206.

The memory 204 may be coupled to the processor 102 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The display unit 206 may include a display surface of the computing system 100. In an example, the display unit 206 may include monitors, liquid crystal display (LCD) screens, and light emitting diode (LED) screens. Additionally or alternatively, the display unit 206 includes touch sensitive technology, for example, resistive, capacitive, acoustic wave, infrared (IR), strain gauge, optical, acoustic pulse recognition, or any combination thereof.

In an example, the processor 102, the modules 104, the data 202, the memory 204, and the display unit 206, such as the display unit 206-1, may form a computing unit 212, such as a smartphone, a tablet, or an all-in-one computer, i.e., a computer that houses a display and a processor in the same case. The computing unit 212 may be integrated with the projector unit 210 and the image capturing unit 208 to form the computing system 100. In some examples, the computing unit 212 may also be coupled with an additional display unit, such as the display unit 206-N. For example, the display unit 206-1 may function as a display of the computing unit 212, while the display unit 206-N may be provided as an additional display, such as a touch sensitive surface. The additional display unit 206-N may also be communicatively coupled to the processor 102 to perform input/output operations.

In one example, the projector unit 210 may provide for displaying images on the display unit 206-N. The projector unit 210 may be communicatively coupled to the processor 102 in order to receive data therefrom for producing light and projecting images. The projector unit 210 may be coupled to the processor 102 through an electric conductor, WiFi, Bluetooth®, an optical connection, an ultrasonic connection, or any combination thereof.

The projector unit 210 may include, among other things, a display module 214 and a flash light unit 216. The flash light unit 216 may provide for display of images on a display surface, such as the display unit 206-N. For instance, light from the flash light unit 216 may be reflected off a mirror (not shown in FIG. 2) to the display surface to project the images. Further, the flash light unit 216 may also function as an illumination source and illuminate surroundings to enable the image capturing unit 208 to capture images. Further, the display module 214 may receive the data including images to be displayed, and may provide for display of the data onto the display unit 206-N. Additionally, in parallel the same or different data may also be displayed by the processor 102 on the display unit 206-1.

In an example, the image capturing unit 208 may be, a camera, which may either take a still image or a video of an object and/or document disposed on the display unit 206-N. The image capturing unit 208 may also be capable of capturing images of other objects in the vicinity. The image capturing unit 208 and the display units 206 may be aligned along an axis passing through a respective central point.

Further, the various image handling units of the computing system 100 may work in tandem with each other and therefore certain color calibrations may also be performed to synchronize the calibration of the components. For example, the color settings of the display unit 206-1, the projector unit 210, and the image capturing unit 208 may be calibrated such that an image captured by the image capturing unit 208 and projected by the projector unit 210 appears to be substantially the same on the display units 206.

In an example, the computing system 100 may provide for color calibration of the various image handling units. The calibration performed by the computing system 100 may be performed, for instance, during the factory calibration of the computing system 100. Further, information pertaining to calibration may be stored as default color calibration settings.

As mentioned before, the computing system 100 may include the modules 104. The modules 104 may in turn include the calibration module 106, and other modules 224. The other modules 224 may include programs or coded instructions that supplement applications and functions, for example, programs in an operating system of the computing system 100.

Further, the data 202 includes calibration data 226 and other data 228. The other data 228 may include data generated and saved by the modules 104 for providing various functionalities of the computing system 100.

In an example, the calibration module 106 may calibrate the image handling units, based on the target calibration point, which may be stored in the calibration data 226. The target calibration point functions as a common reference point for color calibration to synchronize color calibration of the image handling units. The target calibration point may be, for instance, white color, such as D65, in color space. D65 is a standard illuminant defined by the international commission on illumination.

In one example, the calibration module 106 may first calibrate color settings, such as pulse width modulation (PWM) values, white balance & exposure, of the projector unit 210. For instance, the calibration module 106 may calibrate the display module 214 and the flash light unit 216 with respect to the target calibration point to ensure that illumination variation of both the projection by the display module 214 and the flash light unit 216 is minimal and consistent with the target calibration point. In an example, color settings are calibrated with respect to the target calibration point by minimizing the deviation between the current color settings and the target calibration point.

Further, the calibration module 106, based on the calibration performed for the projector unit 210 may calibrate the color settings, such as RGB values in the color space, the image capturing unit 208. In an example, the calibration module 106 may calibrate the image capturing unit 208 based on images captured using the flash light unit 216 to ensure that illumination source is substantially the same for all image handling units. The color calibration of the image capturing unit provides for having similar color representations across the various image handling units regardless of external lighting conditions.

In an example, to calibrate the color settings of the image capturing unit 208, the calibration module 106 may compare a white balance estimation and an exposure estimation of the image capturing unit 208 with respect to a target white balance estimation and a target exposure estimation as indicated by the target calibration point. The target white balance estimation and the target exposure estimation may be stored in the calibration data 226. Further, the white balance estimation and the exposure estimation of the image capturing unit 208 may be determined using the images that are captured by the image capturing unit 208. The calibration module 106 may iteratively adjust the white balance estimation and the exposure estimation till a variation between the white balance estimation and the exposure estimation, and the target white balance estimation and the target exposure estimation is less than a threshold, which may be predefined by a user, such as a color calibration technician.

The calibration module 106 may also calibrate the display unit 206, such as the display unit 206-1, based on the target calibration point. In an example, the calibration module 106 may calibrate the display unit 206-1 of the computing unit 212 of the computing system 100. The display unit 206-1 may be, for instance, a liquid crystal display (LCD) screen. The color settings of the LCD screen may be calibrated using the target calibration point to ensure that color representation of an image displayed by the projector unit 210 on the display unit 206-2 is similar to the color representation of the image displayed on the display unit 206-1. In an example, the calibration module 106 may implement a LCD calibration tool to calibrate the display unit 206-1. The LCD calibration tool may generate an international color consortium (ICC) profile, which includes a mapping between color settings of the display unit 206-1 and the target calibration point. Based on the ICC profile, the color settings of the display unit 206-1 may be adjusted to map on the target calibration point.

Further, in an example, the data pertaining to calibration of various image handling units may be stored in the calibration data 226. Alternatively, the data pertaining to calibration of various image handling units may be stored in a projector memory of the projector unit 210 or an internal memory of the image capturing unit 208.

Thus, the computing system 100 may provide for calibration of color settings of the various image handling devices such that an image with consistent image quality can be captured or displayed on the image handling devices with different color capabilities and under different viewing conditions.

Figure 3:
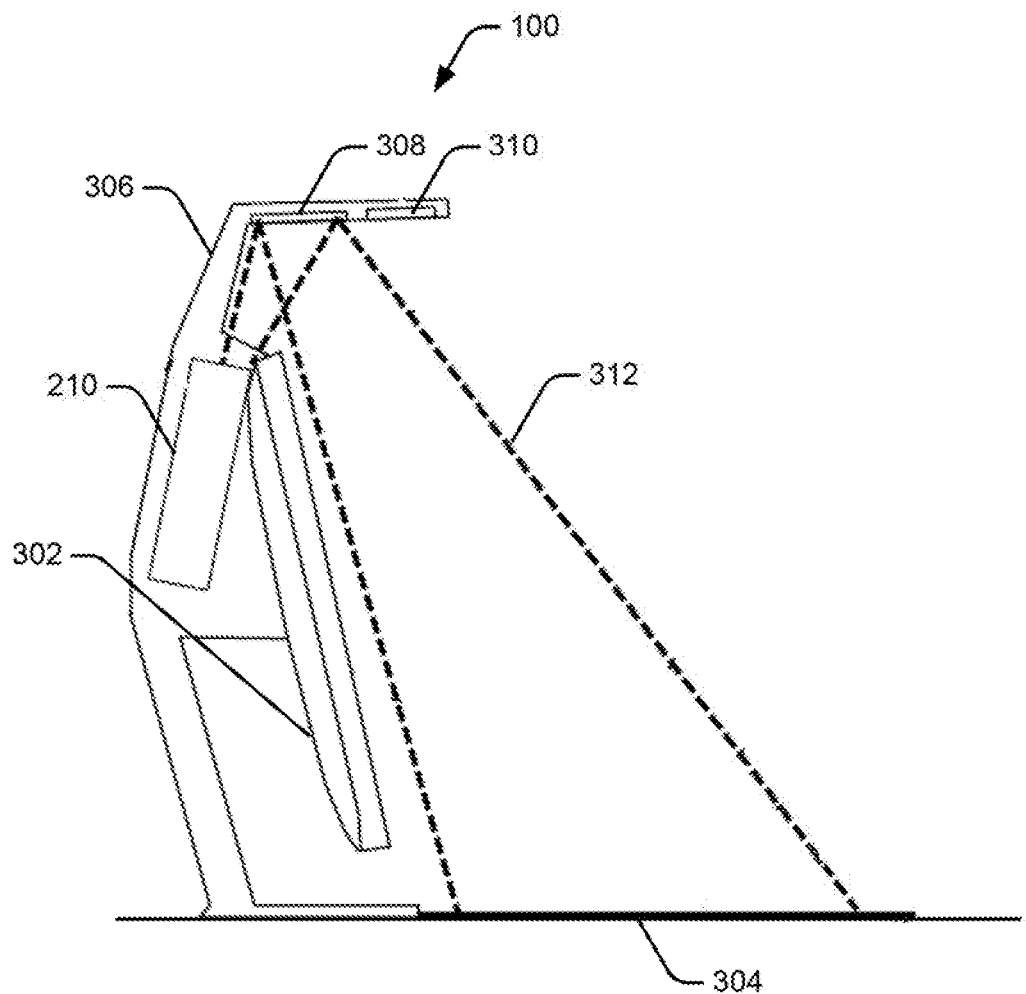
FIG. 3 illustrates an example implementation of a computing system, according to an example of the present subject matter.

FIG. 3 illustrates an example implementation of the computing system 100. As illustrated, the computing system 100 includes two display units, viz., a monitor 302 and a touch mat 304. The monitor 302 may function as the display unit 206-1 and the touch mat 304 may function as the display unit 206-N. The computing system 100 may also include a support base 306 on which components, such as a mirror 808 and a sensor cluster unit 310 may be disposed. The sensor cluster unit 310, among other sensors, may include the image capturing unit 208.

Further, the computing system 100 may include the projector unit 210 to provide for projection of light and images on a display area including the touch mat 304. In an example, the projector unit 210 may include a digital light projector assembly for receiving the data and projecting an image or images corresponding to the received data. For instance, the projector unit 210 may include a digital light processing (DLP) projector or a liquid crystal on silicon (LCoS) projector.

The projector unit 210 may emit light 312, which may be reflected off the mirror 308 towards the touch mat 304, thereby displaying an image on the projector display area. The projector unit 210 may display the images captured by the image capturing unit 208 on the display area. Therefore, the projector unit 210 and the image capturing unit 208 may be calibrated with respect to a common target calibration point to ensure there is minimal or no variation in the image captured and the image displayed.

In an example, the image projected by the projector unit 210 on the projector display area may also be provided on the monitor 302. Accordingly, to have similar image quality across various image handling units, the monitor 302 may also be calibrated with respect to the target calibration point.

Figure 4:
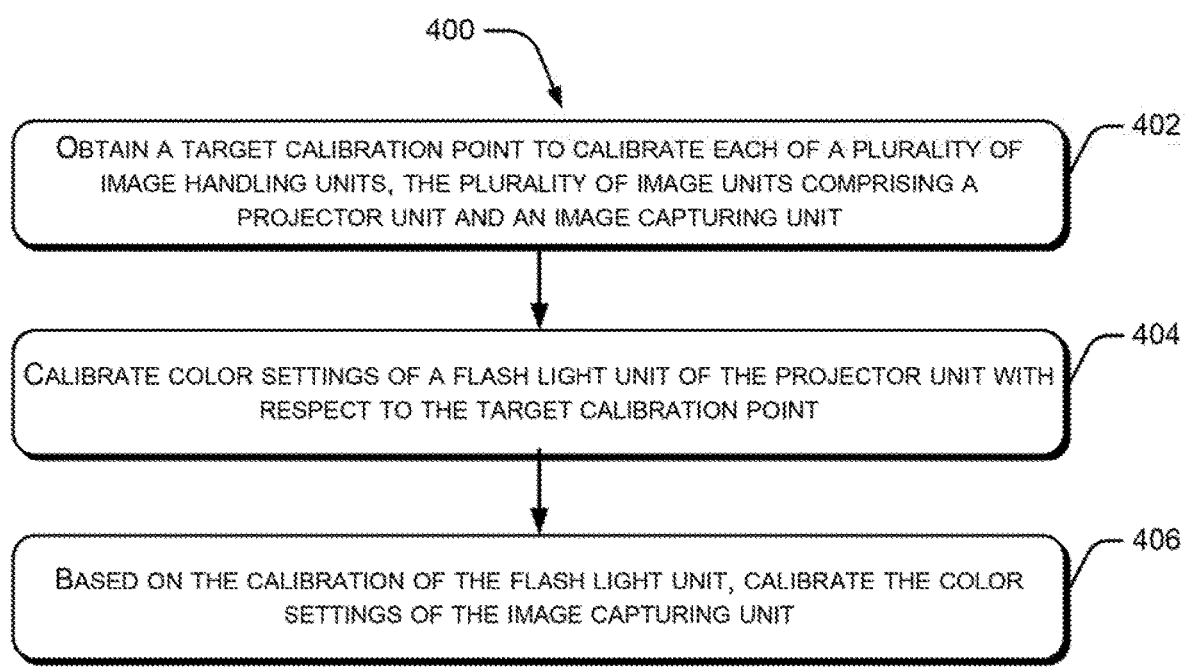
FIG. 4 illustrates an example method for calibrating color settings of image handling units, in accordance with an example of the present subject matter.
Figure 5:
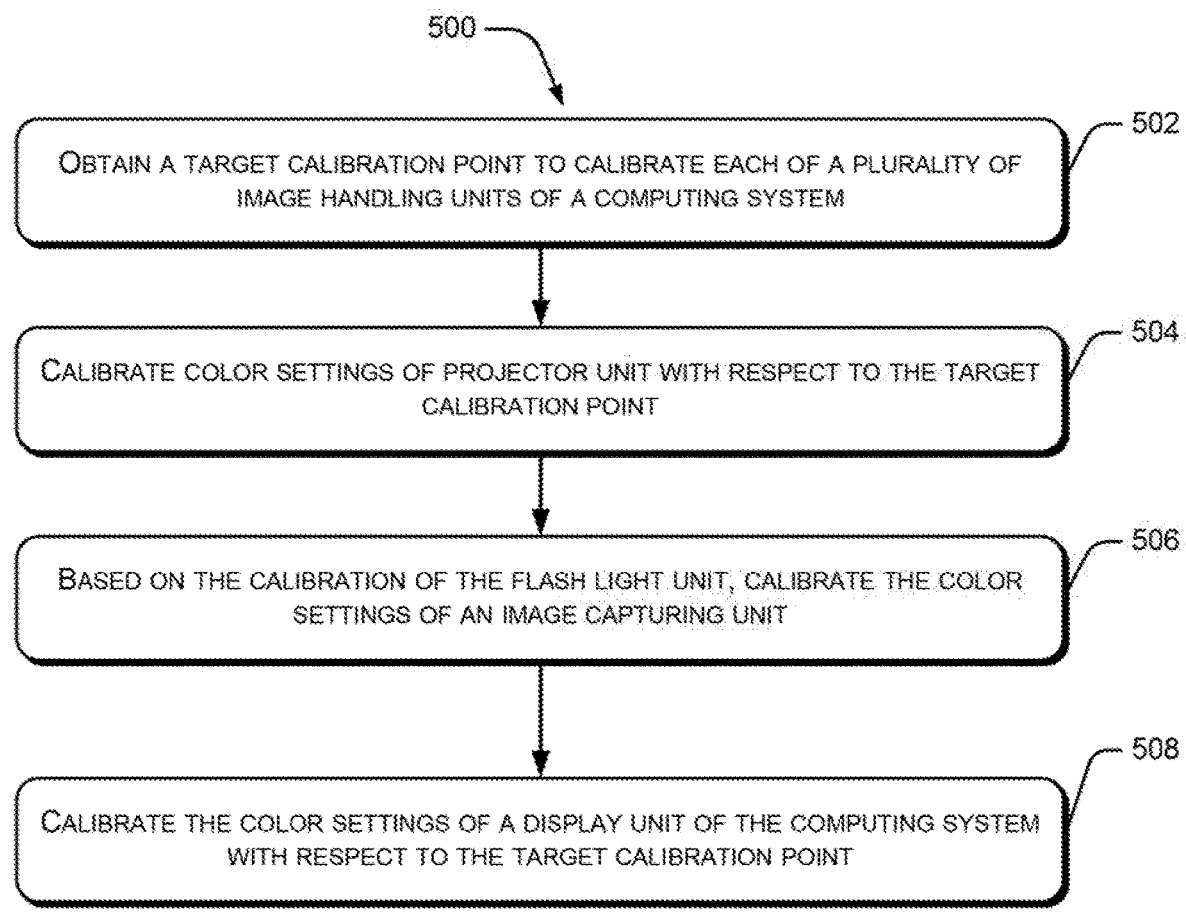
FIG. 5 illustrates another example method for calibrating color settings of image handling units, in accordance with an example of the present subject matter.

FIG. 4 and FIG. 5 illustrate example method 400 and method 500 for calibrating color settings of image handling units of a computing system, such as the computing system 100.

The order in which the methods are described is not intended to be construed as a limitation, and some of the described method blocks can be combined in a different order to implement the methods, or an equivalent alternative method. Additionally, individual blocks may be deleted from the methods without departing from the spirit and scope of the subject matter described herein. Furthermore, the methods may be implemented in any suitable hardware, computer-readable instructions, or combination thereof.

It is appreciated that the methods can be performed by programmed computing devices, for example, based on instructions retrieved from non-transitory computer readable media. The computer readable media can include machine-executable or computer-executable instructions to perform a whole or a part of the described method. The computer readable media may be, for example, digital memories, magnetic storage media, such as a magnetic disks and magnetic tapes, hard drives, or optically readable data storage media.

As depicted in FIG. 4, at block 402, a target calibration point to calibrate each of a plurality of image handling units of the computing system may be obtained. The image handling units include, for example, a projector unit, such as the projector unit 210, and an, image capturing unit, such as the image capturing unit 208. In an example, the target calibration point may be obtained from calibration data, such as the calibration data 226.

At block 404, color settings of a flash light unit of the projector unit may be calibrated with respect to the target calibration point.

At block 406 based on the calibration of the flash light unit and the target calibration point, the color settings of the image capturing unit may be calibrated.

Referring to FIG. 5, the method 500 may be performed using a computing system, such as the computing system 100. At block 502, a target calibration point to calibrate each of a plurality of image handling units of the computing system may be obtained. Examples of the image handling units include, but are not limited to, display units, such as the display units 206, an image capturing unit, such as the image capturing unit 208, and a projector unit, such as the projector unit 210. In an example, the target calibration point may correspond to white color in a color space.

At block 504, color settings of the projector unit may be calibrated with respect to the target calibration point. In an example, a flash light unit and a display module of the projector unit may be calibrated based on the target calibration point. For instance, a calibration module, such as the calibration module 106, may calibrate the color settings image handling units.

At block 506, based on the calibration of the flash light unit the color settings of the image capturing unit may be calibrated.

At block 508, the color settings of a display unit may be calibrated with respect to the target calibration point. In an example, the display unit may be part of a computing unit of the computing system.

Further, the color settings of the image handling units may be stored in one of a projector memory or an internal memory of the image handling unit.

Thus, the various image handling r its of the computing system may be calibrated with respect to a common calibration point, which may provide for uniformity in the images displayed and captured by the image handling units.

Figure 6:
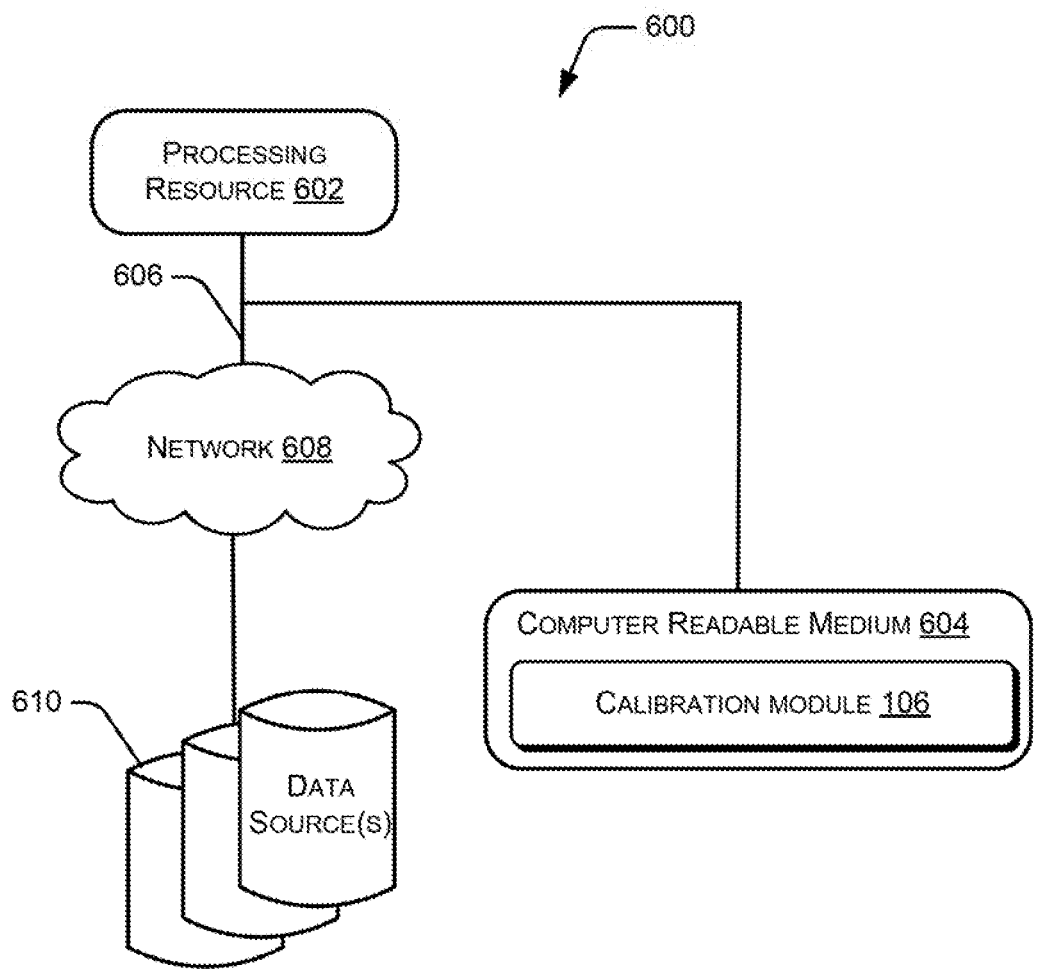
FIG. 6 illustrates an example network environment implementing a non-transitory computer readable medium for color calibration, according to an example of the present subject matter.

FIG. 6 illustrates an example network environment 600 implementing a non-transitory computer readable medium for color calibration, according to an example of the present subject matter. The network environment 600 may be a public networking environment or a private networking environment. In one implementation, the network environment 600 includes a processing resource 602 communicatively coupled to a non-transitory computer readable medium 604 through a communication link 606.

For example, the processing resource 602 can be a processor of a network device, such as the computing system 100. The non-transitory computer readable medium 604 can be, for example, an internal memory device or an external memory device. In one implementation, the communication link 606 may be a direct communication link, such as one formed through a memory read/write interface. In another implementation, the communication link 606 may be an indirect communication link, such as one formed through a network interface. In such a case, the processing resource 602 can access the non-transitory computer readable medium 604 through a network 608. The network 608 may be a single network or a combination of multiple networks and may use a variety of different communication protocols.

The processing resource 602 and the non-transitory computer readable medium 604 may also be communicatively coupled to data sources 610 over the network 608. The data sources 610 can include, for example, databases and computing devices. The data sources 610 may be used by the database administrators and other users to communicate with the processing resource 602.

In one implementation, the non-transitory computer readable medium 604 includes a set, of computer readable instructions, such as instructions for implementing the calibration module 106. The set of computer readable instructions, referred tows instructions hereinafter, can be accessed by the processing resource 602 through the communication link 606 and subsequently executed to perform acts for network service insertion.

For discussion purposes, the execution of the instructions by the processing resource 602 has been described with reference to various components introduced earlier with reference to description of FIGS. 1 and 2.

In an example, the instructions can cause the processing resource 602 to calibrate color settings of image handling units of a computing system, such as the computing system 100. For instance, color settings of a flash light unit of a projector unit, such as the projector unit 210, may be calibrated with reference to a target calibration point. Further, the color settings of an image capturing unit, such as the image capturing unit 208 may be calibrated, based on an image captured using the flash light unit 216 to synchronize the color settings of the image capturing unit to the color settings of the projector unit.

Additionally, the color settings of a display module of the projector unit 210 and a display unit, such as the display unit 206-1, may also be based on the target calibration point.

Thus, the methods and systems of the present subject matter provide for uniform color calibration of multiple image handling units of a computing system. Although implementations for the color calibration of the image handling units have been described in language specific to structural features and methods, it can be understood that the specific structural features and methods are disclosed as examples of systems and methods for the color calibration of the image handling units.

What is claimed is:

1. A computing system comprising:
   a camera;
   a processor; and
   a non-transitory storage medium storing instructions executable on the processor to:
   calibrate color settings of each of a first display and a flash light source of a projector associated with the computing system, with reference to a target calibration point, the calibrating to provide a calibrated first display and a calibrated flash light source, wherein the calibrated first display of the projector is to receive image data, and the projector is to emit light reflected by a mirror towards a second display of the computing system, to display an image represented by the image data on the second display, and the calibrated flash light source is to function as an illumination source for the camera of the computing system;
   calibrate color settings of the camera, based on the target calibration point and an image captured by the camera under illumination provided by the calibrated flash light source, to synchronize the color settings of the camera to the color settings of the first display and the flash light source, the calibrating of the color settings of the camera to provide a calibrated camera;
   receive a further image captured by the calibrated camera, wherein the further image captured by the calibrated camera is of an object disposed on a display surface under illumination provided by the calibrated flash light source; and
   cause display of the further image captured by the calibrated camera on the second display.

2. The computing system of claim 1, wherein the instructions are executable on the processor to further calibrate color settings of the second display with reference to the target calibration point, the second display separate from and outside of the projector.

3. The computing system of claim 2, wherein the instructions are executable on the processor to:
   generate an international color consortium (ICC) profile including a mapping between the target calibration point and the color settings of the second display; and
   calibrate, based on the ICC profile, the color settings of the second display to map on the target calibration point.

4. The computing system of claim 1, wherein the instructions are executable on the processor to:
   determine a white balance estimation and exposure estimation of the camera, based on the image captured by the camera under the illumination provided by the calibrated flash light source; and
   iteratively adjust the white balance estimation and the exposure estimation with respect to a target white balance estimation and a target exposure estimation, respectively, the target white balance estimation and the target exposure estimation corresponding to the target calibration point.

5. The computing system of claim 1, wherein the target calibration point is a white point defining a white color in a color space.

6. A method executed by a system comprising a hardware processor for calibrating color settings for a plurality of image handling units, the method comprising:
   obtaining a target calibration point to calibrate each of the plurality of image handling units, the plurality of image handling units comprising a projector unit and a camera;
   calibrating color settings of a flash light unit of the projector unit with respect to the target calibration point to provide a calibrated flash light unit, wherein the calibrated flash light unit of the projector unit provides ambient light for the camera;
   based on the target calibration point and an image captured by the camera under illumination provided by the calibrated flash light unit, calibrating color settings of the camera to provide a calibrated camera;
   receiving a further image captured by the calibrated camera, wherein the further image captured by the calibrated camera is of an object disposed on a display surface under illumination provided by the calibrated flash light unit; and
   displaying the further image captured by the calibrated camera on a display unit.

7. The method of claim 6, further comprising calibrating color settings of a display module of the projector unit, based on the target calibration point.

8. The method of claim 7, further comprising calibrating color settings of the display unit that is separate from and outside the projector unit, based on the target calibration point, wherein the display unit is an image handling unit of the plurality of image handling units.

9. The method of claim 6, wherein the color settings of the flash light unit and the camera include at least one of pulse width modulation (PWM) values, red green blue (RGB) color space values, exposure estimation, or white balance estimation.

10. The method of claim 6, wherein calibrating the color settings of the camera comprises:
    determining a white balance estimation and exposure estimation of the camera, based on the image captured by the camera under the illumination provided by the calibrated flash light unit;
    iteratively adjusting the white balance estimation and the exposure estimation until a variation between the white balance estimation and the exposure estimation, and a target white balance estimation and a target exposure estimation, respectively, is less than a threshold, the target white balance estimation and the target exposure estimation corresponding to the target calibration point.

11. The method of claim 6, further comprising storing the color settings for the plurality of image handling units in one of a projector memory and an internal memory of the camera.

12. A non-transitory computer readable medium comprising computer readable instructions that, when executed, cause a system comprising a processor to:
    calibrate color settings of a flash light source of a projector of a computing system with reference to a target calibration point to provide a calibrated flash light source, wherein the calibrated flash light source is to function as an illumination source for a camera of the computing system;
    calibrate color settings of the camera, based on an image captured under illumination provided by the calibrated flash light source, to synchronize the color settings of the camera to the color settings of the flash light source, the calibrating of the color settings of the camera to provide a calibrated camera;

receive a further image captured by the calibrated camera, wherein the further image captured by the calibrated camera is of an object disposed on a display surface under illumination provided by the calibrated flash light source; and cause display of the further image captured by the calibrated camera on a first display.

13. The non-transitory computer readable medium of claim 12, wherein the computer readable instructions, when executed, further cause the system to calibrate color settings of a second display of the projector, based on the target calibration point, wherein the calibrated second display provides for display of an image on the first display separate from and outside of the projector.

14. The non-transitory computer readable medium of claim 12, wherein the computer readable instructions, when executed, further cause the system to calibrate color settings of the first display of the computing system, based on the target calibration point.

15. The non-transitory computer readable medium of claim 12, wherein the computer readable instructions, when executed, further cause the system to:

determine a white balance estimation and an exposure estimation of the camera, based on the image captured by the camera under the illumination provided by the calibrated flash light source; and iteratively adjust the white balance estimation and the exposure estimation with respect to a target white balance estimation and a target exposure estimation, respectively, the target white balance estimation and the target exposure estimation corresponding to the target calibration point.

16. The computing system of claim 1, wherein the display surface comprises a touch mat.

17. The computing system of claim 1, wherein the calibrating of the color settings of each of the first display and the flash light source comprises adjusting the color settings of each of the first display and the flash light source, and the calibrating of the color settings of the camera comprises adjusting the color settings of the camera.

18. The computing system of claim 1, wherein the calibrating of the color settings of the flash light source comprises calibrating the color settings of the flash light source by minimizing a deviation between current color settings of the flash light source and the target calibration point.

19. The method of claim 6, wherein the calibrating of the color settings of the flash light unit comprises calibrating the color settings of the flash light unit by minimizing a deviation between current color settings of the flash light unit and the target calibration point.

20. The non-transitory computer readable medium of claim 12, wherein the calibrating of the color settings of the flash light source comprises calibrating the color settings of the flash light source by minimizing a deviation between current color settings of the flash light source and the target calibration point.

* * * * *